United States Patent [19]
Takei

[11] Patent Number: 5,913,376
[45] Date of Patent: Jun. 22, 1999

[54] AUTOMATIC STEERING CONTROL APPARATUS

[75] Inventor: Akihiko Takei, Wako, Japan

[73] Assignee: Honda Giken Kogyo Kabushiki Kaisha, Tokyo, Japan

[21] Appl. No.: 08/740,475

[22] Filed: Oct. 30, 1996

[30] Foreign Application Priority Data

Oct. 31, 1995 [JP] Japan .................................... 7-283978

[51] Int. Cl.$^6$ ........................................................ B60T 7/16
[52] U.S. Cl. ............................................. 180/168; 701/26
[58] Field of Search ................................. 701/23, 25, 26; 180/167, 168

[56] References Cited

U.S. PATENT DOCUMENTS

| | | | |
|---|---|---|---|
| 3,590,383 | 6/1971 | Nakahara | 325/52 |
| 3,696,882 | 10/1972 | Martin | 180/168 |
| 4,939,650 | 7/1990 | Nishikawa | 701/26 |
| 5,229,941 | 7/1993 | Hattori | 701/26 |
| 5,233,526 | 8/1993 | Detriche et al. | 701/26 |
| 5,321,614 | 6/1994 | Ashworth | 701/26 |
| 5,347,456 | 9/1994 | Zhang et al. | 180/168 X |
| 5,369,591 | 11/1994 | Broxmeyer . | |
| 5,471,385 | 11/1995 | Suzuki et al. | 180/168 X |

FOREIGN PATENT DOCUMENTS 5-197412   8/1993   Japan .

Primary Examiner—Lanna Mai
Assistant Examiner—Avraham H. Lerner
Attorney, Agent, or Firm—Lyon & Lyon LLP

[57] ABSTRACT

An automatic steering control apparatus automatically steers a motor vehicle to run along a predetermined running path having path markers. The path markers are detected with a marker sensor on the motor vehicle, and positional relationships between a present position of the motor vehicle and the running path are successively determined based on a detected output signal from the marker sensor. Positions of the motor vehicle on map data stored on the motor vehicle are successively determined based on the positional relationships and the map data. Curvature information of portions of the running path on the map data is attained through communications with a travel information providing facility disposed outside of the motor vehicle, and curvature information of the running path ahead of the recognized present position of the motor vehicle is acquired based on the curvature information attained through communications with the travel information providing facility. Alternatively, curvature information of the running path ahead of the recognized present position of the motor vehicle may be acquired from the map data. A steering control quantity for the motor vehicle is determined based on at least the acquired curvature information, a present speed of the motor vehicle, and a present positional relationship between the motor vehicle and the running path.

20 Claims, 6 Drawing Sheets

AUTOMATIC STEERING CONTROL APPARATUS

BACKGROUND OF THE INVENTION

1. Field of the Invention

The present invention relates to an automatic steering control apparatus for assisting the driver of a motor vehicle in steering the motor vehicle on a road or an expressway to run along a given running path thereon.

2. Description of the Prior Art

There has been proposed in recent years a system wherein path markers such as magnetic nails or the like are installed along a running path on a road and detected by a marker sensor on a motor vehicle to control the motor vehicle to run along the running path while recognizing the positional relationship (representative of a lateral deviation of the motor vehicle from the running path, etc.) of the motor vehicle at a present position from time to time with respect to the running path based on a detected output signal from the marker sensor.

According to the above conventional system, if it is assumed that the steering control quantity (the steering angle) of the motor vehicle is represented by $\delta$, and the lateral deviation of the motor vehicle at the present position from the running path by $\epsilon y$, and the present speed of the motor vehicle by $V$, then the steering control quantity $\delta$ is determined by the following equation:

$$\delta = P(V) \cdot \epsilon y + I(V) \cdot \int \epsilon y \, dt$$

where $P(V) \cdot \epsilon y$ indicates the proportional term of proportional integral control, $P(V)$ indicates a coefficient which is represented by a predetermined function depending on the vehicle speed $V$, $I(V) \cdot \int \epsilon y \, dt$ indicates an integral term, and $I(V)$ indicates a coefficient which is represented by a predetermined function depending on the vehicle speed $V$. The motor vehicle is steered by an actuator according to the steering control quantity $\delta$ as is determined by the above equation.

The steering control of the motor vehicle is carried out in a manner to eliminate the lateral deviation $\epsilon y$ of the motor vehicle from the running path.

With the above steering control process, however, since the steering control quantity is determined depending on only the present speed $V$ of the motor vehicle and the present lateral deviation $\epsilon y$ of the motor vehicle from the running path, steering control errors tend to be accumulated, causing the motor vehicle to deviate from the running path and to undulate the motor vehicle largely with respect to the running path. Particularly if the motor vehicle runs at a speed of 60 km/h or higher, preferably at a high speed of 100 km/h or higher, then when the motor vehicle is in the vicinity of an entrance of a curve, the ability of the motor vehicle to run along the running path according to the steering control process is reduced, making it difficult to steer the motor vehicle accurately along the running path, or allowing the motor vehicle to deviate into an adjacent lane. In the vicinity of an entrance of a curve, since the lateral deviation $\epsilon y$ of the motor vehicle from the running path becomes abruptly large, the steering control quantity abruptly changes, resulting in an abrupt change in the steering control process.

To eliminate the foregoing drawbacks, there has been proposed a system for recognizing a road shape such as a road curvature ahead of a motor vehicle with a CCD camera mounted on the motor vehicle, and controlling the steering of the motor vehicle according to the recognized road shape to permit the motor vehicle to run automatically at high speeds.

The proposed system depends on the CCD camera to recognize the road shape ahead of the motor vehicle precisely for accurate steering control. However, when the motor vehicle runs in bad weather such as rain, snow, etc., the imaging capability of the CCD camera is so poor that it is no longer able to accurately recognize the road shape ahead of the motor vehicle. Therefore, it is difficult to steer the motor vehicle under accurate steering control in bad weather such as rain, snow, etc.

One solution would be to use an infrared camera to accurately recognize the road shape ahead of the motor vehicle in a bad weather such as rain, snow, etc. However, the infrared camera is generally expensive and requires a complex camera system. It is not appropriate and practical to install such an infrared camera system on the motor vehicle for accurate steering control.

SUMMARY OF THE INVENTION

It is therefore an object of the present invention to provide an automatic steering control apparatus for automatically steering a motor vehicle to run reliably and accurately along a predetermined running path at high speeds irrespective of weather conditions, road shapes, etc.

To achieve the above object, there is provided in accordance with a first aspect of the present invention an automatic steering control apparatus for automatically steering a motor vehicle to run along a predetermined running path having path markers, comprising first means for holding map data of the running path, second means for detecting the path markers with a marker sensor on the motor vehicle and successively determining positional relationships between a present position of the motor vehicle and the running path based on a detected output signal from the marker sensor, third means for successively recognizing positions of the motor vehicle on the map data based on the positional relationships and the map data, fourth means for attaining curvature information of portions of the running path on the map data through communications with a travel information providing facility disposed outside of the motor vehicle, fifth means for acquiring curvature information of the running path ahead of the recognized present position of the motor vehicle based on the curvature information attained by the fourth means through communications with the travel information providing facility, and sixth means for determining a steering control quantity for the motor vehicle based on at least the acquired curvature information, a present speed of the motor vehicle, and a present positional relationship between the motor vehicle and the running path.

According to the first aspect of the present invention, a present position of the motor vehicle on the map data held on the motor vehicle is successively recognized using data of the successive positional relationships between the motor vehicle and the running path based on a detected output signal from the marker sensor which is representative of the path markers. Curvature information of various portions of the running path is given to the motor vehicle through communications with the travel information providing facility. Based on the given curvature information, curvature information of the running path ahead of the recognized present position of the motor vehicle is acquired, and a steering control quantity for the motor vehicle is determined based on the acquired curvature information, a present speed of the motor vehicle, and a present positional relationship between the motor vehicle and the running path. Therefore, the steering of the motor vehicle is controlled taking into account the curvature of the running path ahead of the motor vehicle as well as the present speed of the motor vehicle and the present positional relationship between the motor vehicle and the running path.

Since the present positional relationship between the motor vehicle and the running path, which is required for steering control, is determined on the basis of a detected output signal from the marker sensor which is representative of the path markers, it is possible to determine the positional relationship between the motor vehicle and the running path relatively accurately. The position of the motor vehicle can also be recognized relatively accurately using data of the successive positional relationships and the map data of the running path which are held on the motor vehicle. Inasmuch as the curvature information ahead of the motor vehicle is obtained through communications with the travel information providing facility, it can accurately be attained irrespective of weather conditions, etc.

According to the first aspect of the present invention, therefore, the motor vehicle can be steered to run reliably and accurately along the running path while running at high speeds irrespective of weather conditions, road shapes, etc.

The travel information providing facility may comprise a leakage coaxial cable installed on a road along the running path.

According to a second aspect of the present invention, there is also provided an automatic steering control apparatus for automatically steering a motor vehicle to run along a predetermined running path having path markers, comprising first means for holding map data of the running path, second means for detecting the path markers with a marker sensor on the motor vehicle and successively determining positional relationships between a present position of the motor vehicle and the running path based on a detected output signal from the marker sensor, third means for successively recognizing positions of the motor vehicle on the map data based on the positional relationships and the map data, fourth means for acquiring curvature information of the running path ahead of the recognized present position of the motor vehicle from the map data, and fifth means for determining a steering control quantity for the motor vehicle based on at least the acquired curvature information, a present speed of the motor vehicle, and a present positional relationship between the motor vehicle and the running path.

According to the second aspect of the present invention, as with the first aspect of the present invention, a present position of the motor vehicle on the map data held on the motor vehicle is successively recognized. Curvature information of the running path ahead of the recognized present position of the motor vehicle is acquired from the map data, and based on the acquired curvature information, a present speed of the motor vehicle, and a present positional relationship between the motor vehicle and the running path, a steering control quantity for the motor vehicle is determined. Therefore, the steering of the motor vehicle is controlled taking into account the curvature of the running path ahead of the motor vehicle as well as the present speed of the motor vehicle and the present positional relationship between the motor vehicle and the running path.

As with the first aspect of the present invention, since the present positional relationship between the motor vehicle and the running path, which is required for steering control, is determined on the basis of a detected output signal from the marker sensor which is representative of the path markers, it is possible to determine the positional relationship between the motor vehicle and the running path relatively accurately. The position of the motor vehicle can also be recognized relatively accurately using data of the successive positional relationships and the map data of the running path which are held on the motor vehicle. Inasmuch as the curvature information ahead of the motor vehicle is obtained from the map data held on the motor vehicle, it can accurately be attained irrespective of weather conditions, etc.

According to the second aspect of the present invention, therefore, the motor vehicle can be steered to run reliably and accurately along the running path while running at high speeds irrespective of weather conditions, road shapes, etc.

In the first and second aspects of the present invention, the path markers may comprise magnetic sources arranged on the road at spaced intervals along the running path, and the marker sensor may comprise a magnetic sensor. The magnetic sources can thus be detected regardless of weather conditions, dirt on the road, etc., making it possible to recognize highly reliably the positional relationship between the motor vehicle and the running path.

In the first and second aspects of the present invention, each of the positional relationships between the motor vehicle and the running path represents a lateral deviation of a center of the motor vehicle from the running path, and an azimuth deviation of a direction traveled by the motor vehicle from the running path.

The third means may comprise means for successively determining a route traveled by the motor vehicle based on the speed of the motor vehicle and a yaw rate of the motor vehicle, and the present position of the motor vehicle on the map data may be determined from the determined route, the positional relationships between the motor vehicle and the running path, and the map data of the running path.

Furthermore, in the first and second aspects of the present invention, automatic steering control apparatus may further comprise means for determining a deviational angle, as a predicted angle, between a direction to be traveled by the motor vehicle after a predetermined time if the motor vehicle runs under present running conditions from the present position of the motor vehicle, and a direction of the motor vehicle at a location of the running path which corresponds to a position to be reached by the motor vehicle after the predetermined time, and the sixth means in the first aspect or the fifth means in the second aspect may comprise means for determining the steering control quantity based on the predicted angle, the curvature information of the running path ahead of the motor vehicle, the present speed of the motor vehicle, and the present positional relationship between the motor vehicle and the running path.

As described above, the deviational angle between the direction to be traveled by the motor vehicle in the future after the predetermined time and the direction of the motor vehicle is determined as a predicted angle, and the predicted angle is taken into consideration in determining the steering control quantity. The steering control quantity thus determined allows the motor vehicle to run more smoothly along the running path.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An algorithm for steering control which is employed by an automatic steering control apparatus according to the present invention is applicable to not only a steering control mode for controlling the steering of each of a plurality of motor vehicles that run one after another while keeping suitable distances therebetween in a so-called platoon running pattern, but also a steering control mode for controlling the steering of a single motor vehicle that runs independently.

Figure 1:
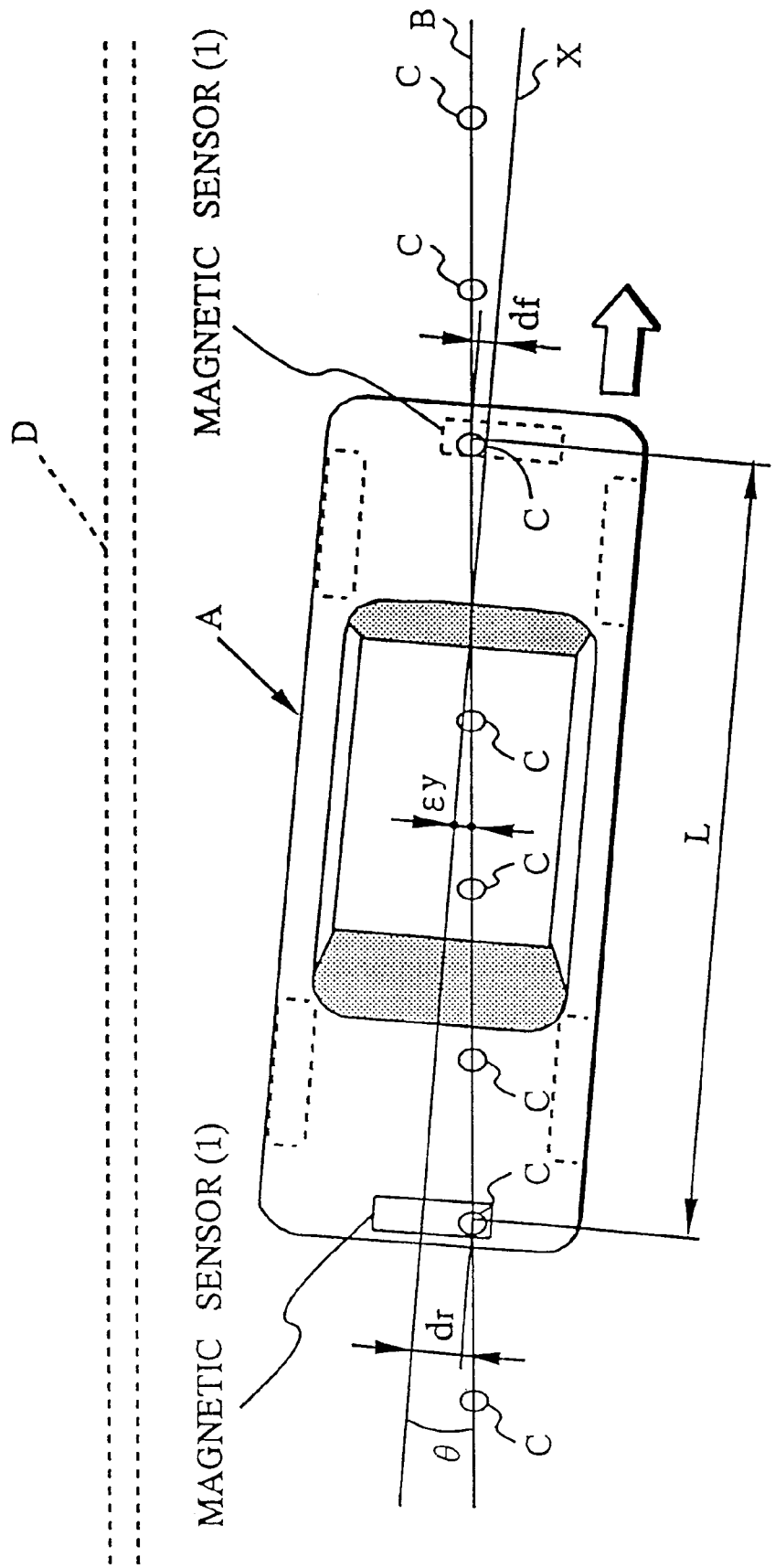
FIG. 1 is a schematic view illustrative of the manner in which a motor vehicle runs under the control of an automatic steering control apparatus according to the present invention.

FIG. 1 shows the manner in which a motor vehicle runs under the control of an automatic steering control apparatus according to the present invention.

As shown in FIG. 1, a plurality of path markers or magnetic nails C are embedded at equal intervals in a road along a predetermined running path B for running a motor vehicle A therealong, and an LCX (leakage coaxial) cable D is installed as a travel information providing facility on the road along the running path B. The LCX cable D transmits various items of travel information including curvature information, road condition information, speed command information, etc. at various areas of the running path B to the motor vehicle A running on the running path B. Two magnetic sensors 1 are disposed respectively beneath front and rear ends of the motor vehicle A for detecting magnetic forces from the magnetic nails C that are positioned below the front and rear ends of the motor vehicle A. Based on detected data from the magnetic sensors 1 and the travel information transmitted from the LCX cable D, the automatic steering control apparatus according to the present invention controls the speed and steering of the motor vehicle A to run automatically along the running path B. When magnetic nails C are positioned below the respective magnetic sensors 1, the magnetic sensors 1 output respective signals commensurate with displacements df, dr of the respective magnetic nails C in the transverse direction of the motor vehicle A from a longitudinal central axis X of the motor vehicle A, i.e., lateral displacements df, dr of the motor vehicle A with respect to the running path B at the respective front and rear ends of the motor vehicle A.

Figure 2:
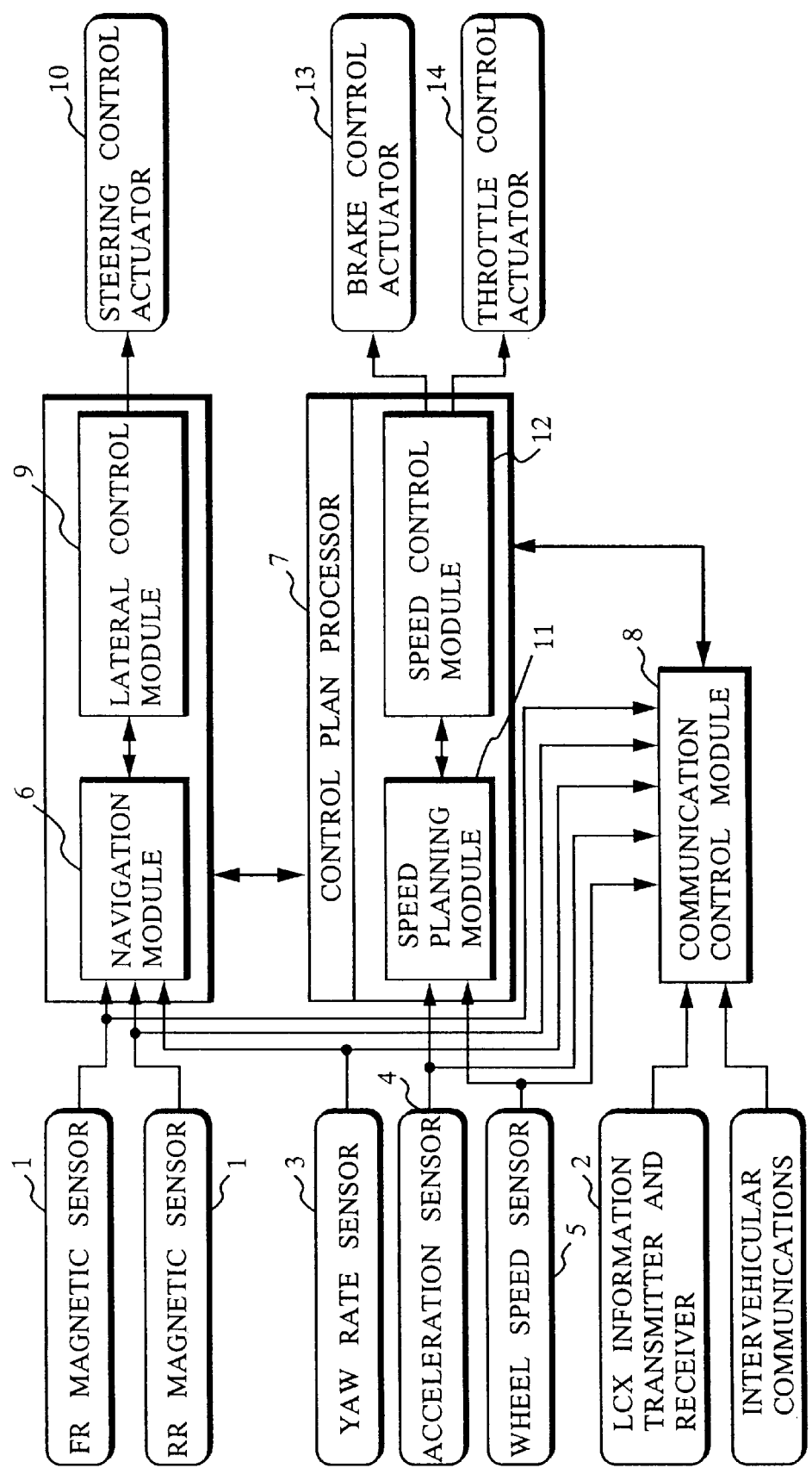
FIG. 2 is a block diagram of a system configuration of the motor vehicle which incorporates the automatic steering control apparatus.

The motor vehicle A, which incorporates the automatic steering control apparatus according to the present invention, has a system configuration as shown in FIG. 2.

As shown in FIG. 2, the motor vehicle A has an LCX information transmitter and receiver 2 for receiving travel information such as curvature information of the running path B, transmitted from the LCX cable D, a yaw rate sensor 3 for detecting a yaw rate of the motor vehicle A, and an acceleration sensor 4 for detecting an acceleration of the motor vehicle A in a longitudinal direction thereof, and a wheel speed sensor 5 for detecting a vehicle speed of the motor vehicle A and a distance traversed by the motor vehicle A.

The motor vehicle A also has a navigation device 6 for calculating the route along which the motor vehicle A has run and the positional relationship of the motor vehicle A with respect to the running path B to determine the position where the motor vehicle A runs on map data (described later on), a control plan processor 7 for calculating a control plan for the motor vehicle A, a communication control device 8 for controlling an exchange of information representative of running states of various motor vehicles running on the running path B between the motor vehicles, a lateral control device 9 for calculating a steering control quantity for the motor vehicle A based on output data from the navigation device 6, and an electronically controlled power steering actuator 10 for steering the motor vehicle A according to the steering control quantity calculated by the lateral control device 9. The control plan processor 7 has a speed planning device 11 for generating a speed plan for the motor vehicle A on the running path B, and a speed control device 12 for calculating a speed control quantity for the motor vehicle A according to the speed plan generated by the speed planning device 11. The speed control device 12 controls a brake control actuator 13 and a throttle control actuator 14 according to the speed control quantity calculated thereby. The navigation device 6, the communication control device 8, the lateral control device 9, the speed planning device 11, and the speed control device 12 have respective central processing units (CPUs) of their own, and transmit and receive data between each other.

Figure 3:
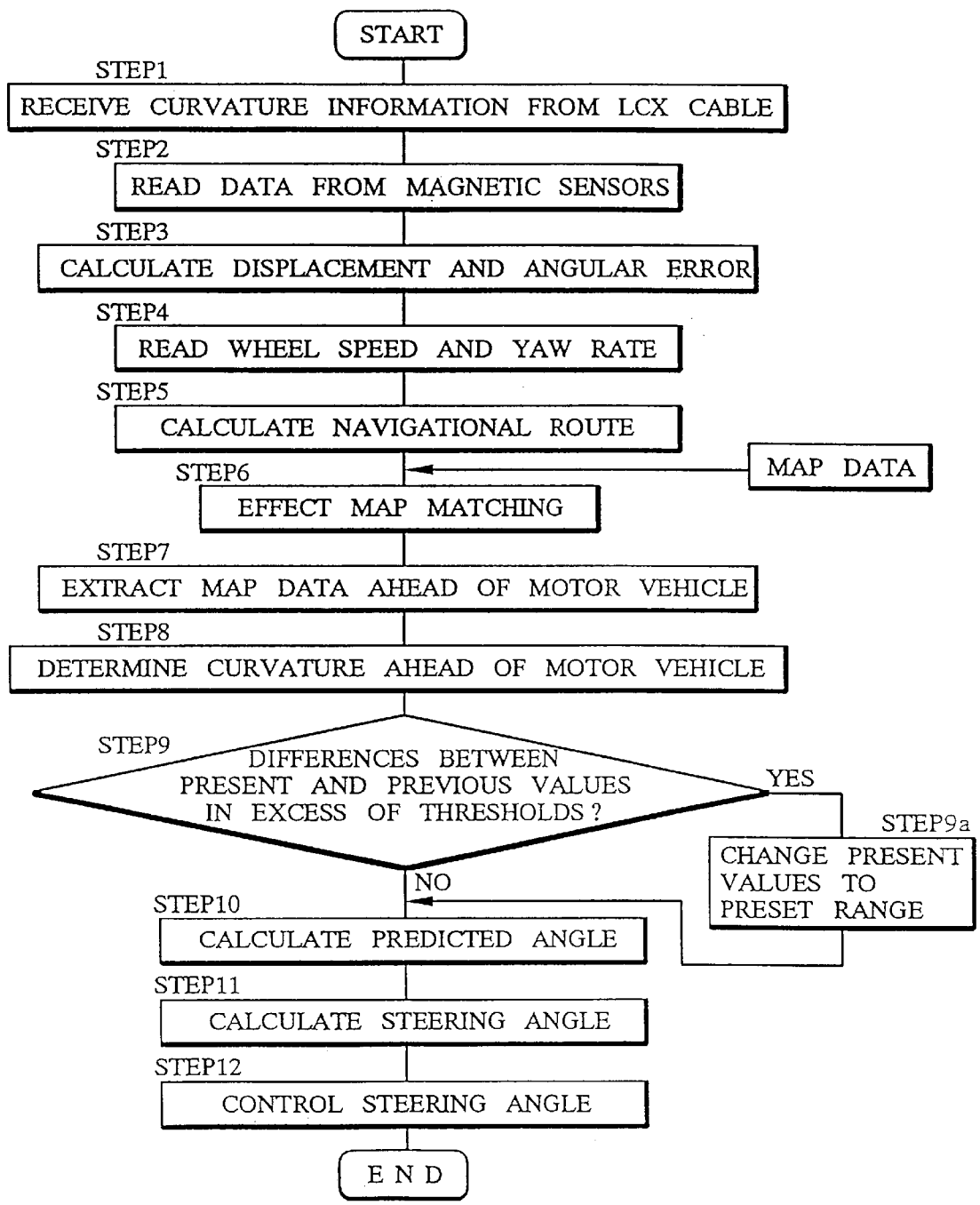
FIG. 3 is a flowchart of a steering control process which is carried out by the automatic steering control apparatus.
Figure 4:
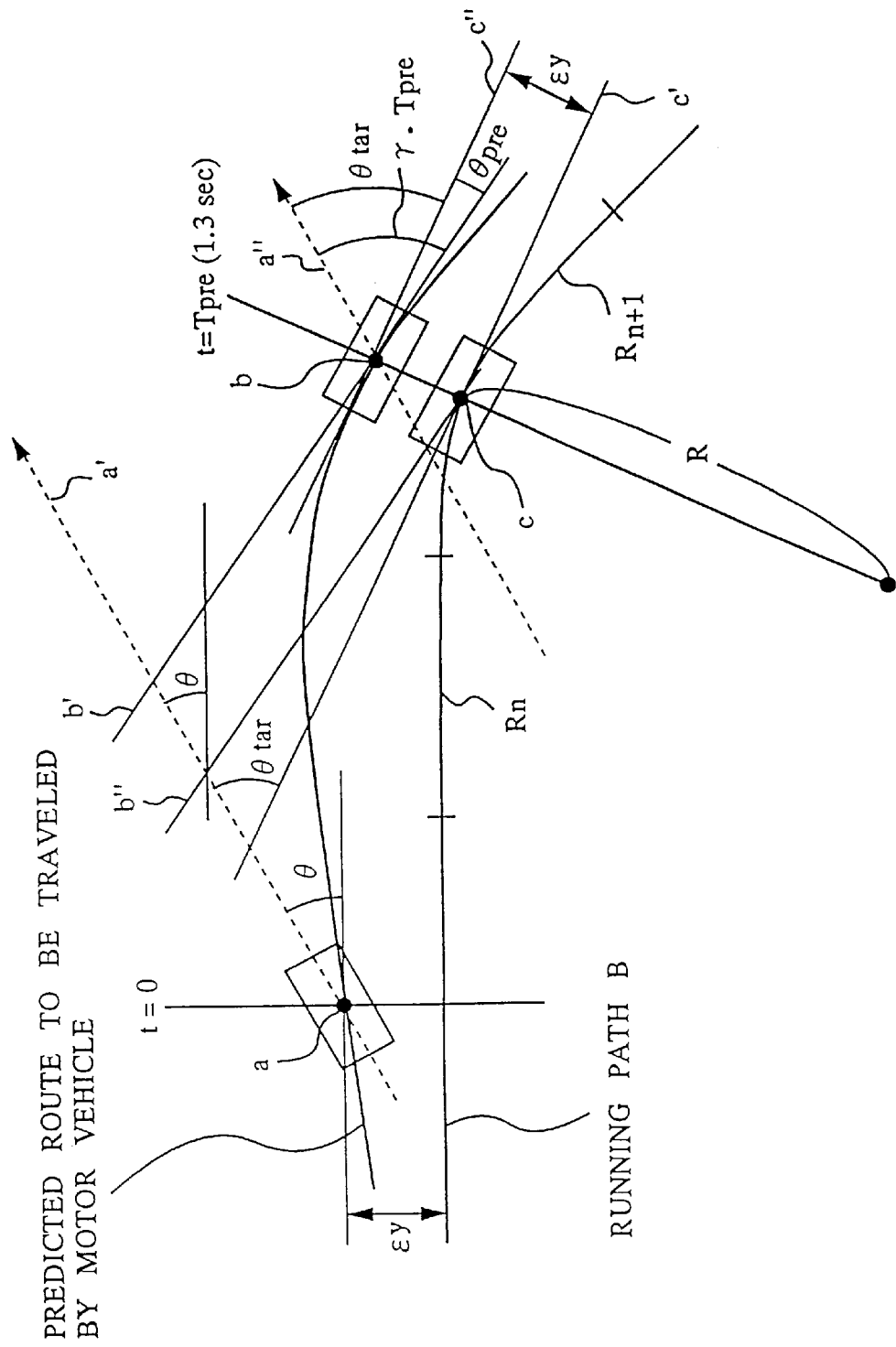
FIG. 4 is a schematic view illustrative of the steering control process.
Figure 5:
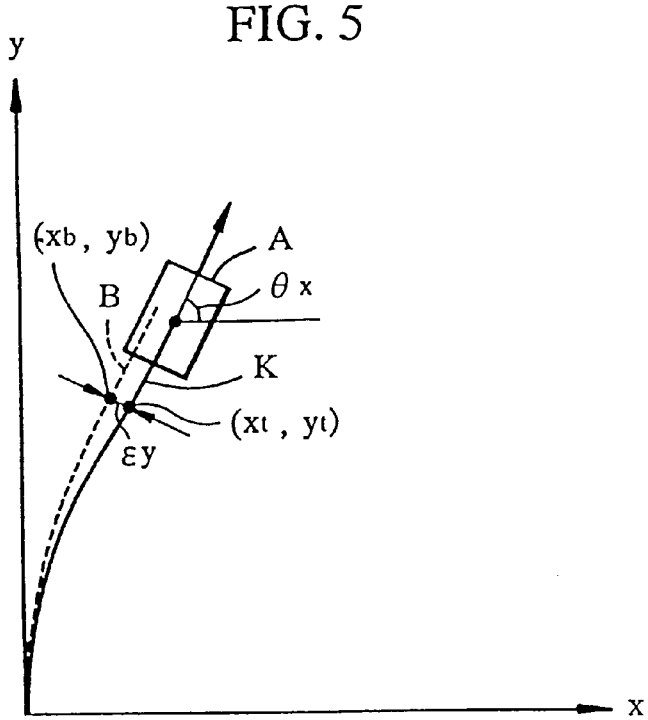
FIG. 5 is a diagram illustrative of the steering control process.
Figure 6:
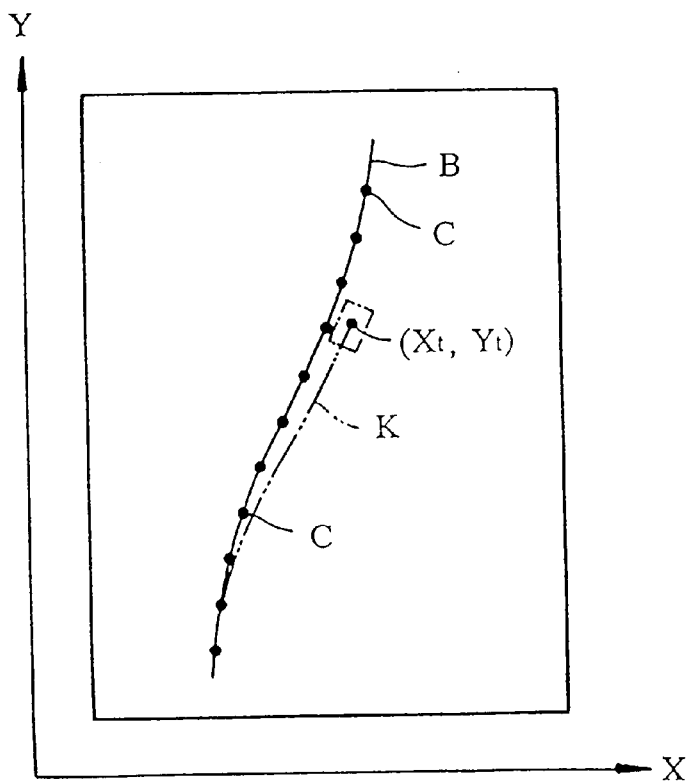
FIG. 6 is a diagram showing map data used in the steering control process.

A first embodiment of the algorithm for steering control as employed by the automatic steering control apparatus to control the motor vehicle A will be described below with reference to FIGS. 3 through 6. FIG. 3 shows a steering control process which is carried out by the automatic steering control apparatus. FIGS. 4 through 6 schematically show how the automatic steering control apparatus operates.

In FIG. 4, the letter "a" represents an actual position of the motor vehicle A at a time t=0 (present time), the letter "b" represents a position predicted to be reached by the motor vehicle A after a predetermined predicted time Tpre (1.3 seconds) if the motor vehicle A runs under present running conditions, the letter "c" represents a position planned to be reached by the motor vehicle A on the running path B after the predicted time Tpre (1.3 seconds), the letter "a'" represents an actual direction in which the motor vehicle A is traveling at present, the letter "a''" represents a line parallel to the direction a', the letter "b'" represents a direction in which the motor vehicle A is predicted to be traveling at the predicted position b after the predicted time Tpre (1.3 seconds), the letter "b''" represents a line parallel to the direction b', the letter "c'" represents a direction in which the motor vehicle A is planned to be traveling at the planned position c on the running path B after the predicted time Tpre (1.3 seconds), i.e., a line tangential to the running path B at the planned position c, and the letter "c''" represents a line parallel to the direction c'. The letters "Rn" represent a radius of curvature (the reciprocal of a curvature) of the running path B at the position of the motor vehicle A after a predetermined time T (e.g., 1 second) within a range from 0.8 to 1.2 seconds, and the letters "Rn+1" represent a radius of curvature (the reciprocal of a curvature) of the running path B at the planned position c on the running path B after the predicted time Tpre. The letters "εy" represent a lateral displacement (a lateral deviation) of the center of the motor vehicle A from the running path B, and the letter "θ"

represents an angular error (azimuth deviation) formed between the direction in which the motor vehicle A is traveling and the running path B at the present position of the motor vehicle A. The predicted time Tpre and the radius Rn+1 of curvature of the running path B after the predicted time Tpre are not used in the first embodiment, but will be used in a second embodiment, described later.

As shown in FIG. 3, at the present position of the motor vehicle A at the time t=0, the communication control device 8 receives curvature information at various locations in a given zone of the running path B, including a portion thereof ahead of the motor vehicle A, from the LCX cable D through the LCX information transmitter and receiver 2, and stores the received curvature information in a memory (not shown) in a step 1.

In a step 2, detected data from the magnetic sensors 1, which are indicative of the magnetic nails C that are positioned respectively below the magnetic sensors 1, are read and stored in the memory. The detected data represent lateral displacements of the motor vehicle A at the magnetic sensors 1 from the running path B, and are given to the navigation device 6.

In a step 3, the navigation device 6 determines a lateral displacement ϵy of the center of the motor vehicle A from the running path B, and an angular error θ (see FIGS. 1 and 4) between the direction in which the motor vehicle A is traveling and the running path B, from the detected data that have been read from the magnetic sensors 1 in the step 2. The lateral displacement ϵy and the angular error θ can be calculated from the lateral displacements df, dr (the detected data from the magnetic sensors 1, see FIG. 1) of the motor vehicle A with respect to the running path B at the respective magnetic sensors 1 according to predetermined geometric equations depending on the distance between the magnetic sensors 1, the positional relationship between the magnetic sensors 1 and the center of the motor vehicle A, etc.

Specifically, as shown in FIG. 1, if it is assumed that the displacements df, dr detected by the respective magnetic sensors 1 are positive on the left-hand side of the central axis X and negative on the right-hand side of the central axis X as viewed opposite to the direction in which the motor vehicle A travels, then the displacements df, dr are df>0 and dr<0 in FIG. 1, and the angular error θ is expressed by the following equation:

$$\theta=\tan^{-1}[(df-dr)/L]$$

where L is the distance between the magnetic sensors 1; and the displacement ϵy of the center (a midpoint between the magnetic sensors 1) of the motor vehicle A from the running path B is expressed by the following equation:

$$\epsilon y=(df+dr)/2.$$

In a step 4, the present speed of the motor vehicle A is calculated from an output signal from the wheel speed sensor 5 by the control plan processor 7. The calculated speed of the motor vehicle A and the yaw rate of the motor vehicle A which is detected by the yaw rate sensor 3 are read into the navigation device 6, and stored in a memory therein.

In a step 5, the navigation device 6 calculates a route along which the motor vehicle A has been running, from the speed and yaw rate of the motor vehicle A which have been read in the step 4, and also calculates the positional relationship of the running path B with respect to the calculated route along which the motor vehicle A has been running, based on the displacement ϵy of the center of the motor vehicle A which is calculated in the step 3.

More specifically, as shown in FIG. 5, an x-y coordinate system is established with respect to a start point where the motor vehicle A has started automatically running. The x-y coordinate system has an x-axis representing the transverse direction of the motor vehicle A at the start point and a y-axis representing the longitudinal direction of the motor vehicle A at the start point. The yaw rate detected from the start point is integrated each time it is read in the step 4 for thereby calculating an azimuth θx at which the motor vehicle A travels, i.e., an angle between the direction in which the motor vehicle A travels and the x-axis, in the x-y coordinate system. In calculating the azimuth θx, a lateral slip angle, i.e., an angle formed between the actual direction in which the motor vehicle A travels and the longitudinal direction of the motor vehicle A, which is produced when the steering quantity of the motor vehicle A is relatively large, may be taken into consideration.

The azimuth θx and the vehicle speed V that has been read together with the yaw rate in the step 4 are then subjected to integral calculations, given below, to calculate coordinates (xt, yt) of the motor vehicle A in the x-y coordinate system for thereby determining a route K along which the motor vehicle A has been running, as shown in FIG. 5.

$$xt=\int v\cdot\cos\theta x dt,\ \text{and}$$

$$yt=\int v\cdot\sin\theta x dt.$$

Concurrent with the calculation of the route K, coordinates (xb, yb) of the running path B corresponding to the coordinates (xt, yt) of the motor vehicle A on the route K are determined from the displacement ϵy of the center of the motor vehicle A that has been calculated in the step 3, thereby determining the position of the running path B in the x-y coordinate system. The coordinates (xb, yb) of the running path B are equal to coordinates of a point which is displaced the displacement ϵy in the lateral direction of the motor vehicle A from the coordinates (xt, yt) of the motor vehicle A on the route K.

In a step 6, a map matching process is carried out by comparing map data of the running path B, i.e., data of the array of the magnetic nails C, which are stored in an electronic map medium such as a CD-ROM or the like in the navigation device 6, with the route K and the running path B which have been determined in the x-y coordinate system in the step 5, thereby determining the present position of the motor vehicle A on the map data.

Specifically, as shown in FIG. 6, the map data are represented as positional data of the running path B, i.e., positional data of the array of the magnetic nails C, in an X-Y coordinate system established with respect to a certain point on a map, e.g., a starting point of the running path B, or a point having certain longitude and latitude values. The route K determined in the x-y coordinate system is converted into coordinates in the X-Y coordinate system of the map data in a manner to equalize the running path B of the map data with the running path B determined in the x-y coordinate system, thereby determining the present position (Xt, Yt) of the motor vehicle A in the map data, i.e., in the X-Y coordinate system.

The map data described above may alternatively be received from the LCX cable D through communications with the LCX cable D in every zone of the running path B, and stored in a suitable memory.

In a step 7, the navigation device 6 extracts a certain range, e.g., up to 500 m ahead of the present position of the motor vehicle A, of the map data of the running path B ahead of the present position of the motor vehicle A, based on the present position (Xt, Yt) of the motor vehicle A that has been determined on the map data, and stores the extracted map data in the memory.

In a step 8, a curvature 1/Rn (see FIG. 4) of the running path B at a location corresponding to the point predicted to be reached by the motor vehicle A after the predetermined time T (e.g., 1 second) if the motor vehicle A runs under present conditions, i.e., a point to which the motor vehicle A has traveled forward on the running path B by a distance of V·T from the point on the running path B which corresponds to the present position, is determined on the basis of the present position (Xt, Yt) of the motor vehicle A and the curvature information at various locations which has been received from the LCX cable D in the step 1.

In a step 9, the navigation device 6 compares the present value of the lateral displacement $\epsilon y$ of the center of the motor vehicle A, which has been determined in the step 3, and the angular error $\theta$, with respective previous values thereof, to determine whether the differences between the present and previous values exceed predetermined threshold values or not. If the differences exceed predetermined threshold values, then the navigation device 6 in step 9a changes the present values of the lateral displacement $\epsilon y$ and the angular error $\theta$ to fall in a preset range with respect to the previous values.

The steps 9, 9a are executed for the reason described below. When the lateral displacement $\epsilon y$ and the angular error $\theta$ vary greatly, if the values of the lateral displacement $\epsilon y$ and the angular error $\theta$ which have been determined in the step 3 are used as they are to determine a steering control quantity to steer the motor vehicle A, then the behavior of the motor vehicle A may change rapidly, tending to largely impair the riding comfort of the motor vehicle A. In the steps 9, 9a, changes in the values of the lateral displacement $\epsilon y$ and the angular error $\theta$ which are necessary for the steering control process are limited to avoid the above shortcoming.

A step 10 is omitted in the first embodiment of the algorithm for steering control.

In a step 11, the lateral control device 9 determines a steering control quantity, i.e., a steering angle, $\delta$, based on the displacement $\epsilon y$ and the angular error $\theta$ determined in the step 3, of the motor vehicle A with respect to the running path B (or the limited values of the displacement $\epsilon y$ and the angular error $\theta$ if the step 9a is executed), the present vehicle speed V, and the curvature 1/Rn, determined in the step 8, of the running path B after the predetermined time T, according to the equation (1) given below. Then, the lateral control device 9 sends a command to the electronically controlled power steering actuator 10 to steer the motor vehicle A according to the determined steering control quantity $\delta$, i.e., through the determined steering angle in a step 12.

$$\delta = P(V, 1/Rn)\cdot\epsilon y + I(V, 1/Rn)\int\epsilon y dt + P'(V, 1/Rn)\cdot\theta \quad (1)$$

where P(V, 1/Rn) represents a predetermined function of the vehicle speed v and the curvature 1/Rn, which is established such that the greater the vehicle speed V, the smaller the value of the function P(V, 1/Rn), and the greater the curvature 1/Rn, the greater the value of the function P(V, 1/Rn). Specifically, the function P(V, 1/Rn) is established according to the following equation using the vehicle speed V and the curvature 1/Rn to attain the above tendency thereof:

$$P(V, 1/Rn) = P0\cdot(V0/V)\cdot[1+(1/Rn)\cdot k]$$

where P0, k represent experimentally established constants, and V0 is set to V0=16.6 in this embodiment with the vehicle speed of 60 km/h (=16.6 m/s) being set to a standard vehicle speed.

In the equation (1), I(V, 1/Rn) represents a predetermined function of the vehicle speed V and the curvature 1/Rn, which is established such that the greater the vehicle speed V, the smaller the value of the function I(V, 1/Rn), and the greater the curvature 1/Rn, the greater the value of the function I(V, 1/Rn). Specifically, the function I(V, 1/Rn) is established according to the following equation using the vehicle speed V and the curvature 1/Rn to attain the above tendency thereof:

$$I(V, 1/Rn) = I0(1/Rn)\cdot(V0/V)$$

where I0(1/Rn) represents a value determined from a predetermined data table based on the curvature 1/Rn. This data table is established such that the greater the curvature 1/Rn, the greater the value I0(1/Rn), and the smaller the curvature 1/Rn, the smaller the value I0(1/Rn) becomes until it reaches about zero.

In the equation (1), P'(V, 1/Rn) represents a predetermined function of the vehicle speed V and the curvature 1/Rn, which is established such that the greater the vehicle speed V, the smaller the value of the function P'(V, 1/Rn), and the greater the curvature 1/Rn, the greater the value of the function P'(V, 1/Rn). Specifically, the function P'(V, 1/Rn) is established according to the following equation, similar to the above equation of P(V, 1/Rn), using the vehicle speed V and the curvature 1/Rn to attain the above tendency thereof:

$$P'(V, 1/Rn) = P0'\cdot(V0/V)\cdot[1+(1/Rn)\cdot k']$$

where P0', k' represent experimentally established constants.

The motor vehicle A is steered according to the steering control quantity (steering angle) $\delta$ determined by the equation (1) to run smoothly and stably along the running path B in its curved sections as well as straight sections.

The terms P(V, 1/Rn)·$\epsilon y$ and I(V, 1/Rn)$\int\epsilon y dt$ on the right-hand side of the above equation (1) for determining the steering control quantity $\delta$ are proportional and integral terms, respectively, of the displacement $\epsilon y$, and basically function to reduce the displacement $\epsilon y$ to cause the motor vehicle A to follow the running path B for thereby steering the motor vehicle A to displace its center toward the running path B. If the motor vehicle A is to be abruptly displaced toward the running path B while the vehicle speed V is relatively large, then the motor vehicle A is subject to a large lateral acceleration. At this time, since the coefficient P(V, 1/Rn) of the proportional term and the coefficient I(V, 1/Rn) of the integral term become smaller as the vehicle speed V is higher, as described above, the abrupt displacement of the motor vehicle A is suppressed to allow the motor vehicle A to be displaced smoothly toward the running path B.

If the curvature 1/Rn of the running path B ahead of the motor vehicle A becomes large, then since the coefficients P(V, 1/Rn), I(V, 1/Rn) become large, the ability of the motor vehicle A to follow the running path B in a curved section thereof is increased, preventing the motor vehicle A from deviating outwardly from the curved section of the running path B.

In a straight section of the running path B where the curvature 1/Rn is about zero, if the value of the integral term is large, then the position of the motor vehicle A is apt to oscillate with respect to the running path B. However, inasmuch as the coefficient I(V, 1/Rn) becomes sufficiently small, the value of the integral term also becomes sufficiently small, stabilizing the ability of the motor vehicle A to follow the running path B.

The term P'(V, 1/Rn)·θ on the right-hand side of the equation (1) is a proportional term of the angular error θ, and basically functions to reduce the angular error θ for thereby orienting the direction in which the motor vehicle A travels toward the direction of the running path B. When the vehicle speed V is relatively large, since the coefficient P'(V, 1/Rn)·θ is small, an excessive change in the direction in which the motor vehicle A travels is suppressed, allowing the direction in which the motor vehicle A travels to follow the running path B stably and smoothly.

In a curved section of the running path B where the curvature 1/Rn is large, since the coefficient P'(V, 1/Rn)·θ is large, the ability for the direction in which the motor vehicle A travels to follow the running path B is increased, permitting the motor vehicle A to run smoothly along the curved section of the running path B.

In the steering control process according to the present embodiment, the steering control quantity δ is determined taking into account not only the present speed V of the motor vehicle A and the displacement εy of the motor vehicle A from the running path B, but also the curvature 1/Rn of the running path B ahead of the motor vehicle A and the angular error θ between the direction in which the motor vehicle A travels and the running path B, and the steering of the motor vehicle A is controlled according to the steering control quantity δ thus determined. Consequently, the motor vehicle A can be steered to run smoothly and stably along the running path B in its curved sections as well as straight sections.

The displacement εy and the angular error θ which are required to determine the steering control quantity δ are determined based on the magnetic detection of the magnetic nails C by the magnetic sensors 1, and the curvature 1/Rn of the running path B ahead of the motor vehicle A is obtained from communications with the LCX cable D. Therefore, the data of the displacement εy, the angular error θ, and the curvature 1/Rn can accurately be attained irrespective of weather conditions, etc. Because the motor vehicle A is steered according to the steering control quantity δ which has been determined using those data, the motor vehicle A can run accurately along the running path B irrespective of weather conditions, etc.

A second embodiment of the algorithm for steering control to control the motor vehicle A which has the system arrangement shown in FIG. 2 will be described below with reference to FIGS. 3 and 4.

In the second embodiment, the steps ranging from the step 1 to the steps 9, 9a shown in FIG. 3 are executed in exactly the same manner as with the first embodiment, and will not be described below.

However, in the step 8, a curvature of the running path B at the present position of the motor vehicle A, and a curvature 1/Rn+1 (see FIG. 4) of the running path B at a location corresponding to the point predicted to be reached by the motor vehicle A after the predicted time Tpre (1.3 seconds) if the motor vehicle A runs under present conditions, i.e., a point to which the motor vehicle A has traveled forward on the running path B by a distance of V·Tpre from the point on the running path B which corresponds to the present position, are determined on the basis of the curvature information which has been received from the LCX cable D.

According to the second embodiment, in a step 10, the navigation device 6 determines a predicted angle θpre between a direction (indicated by b' in FIG. 4) in which the motor vehicle A is predicted to be traveling at a point (b in FIG. 4) that is predicted to be reached by the motor vehicle A after the predicted time Tpre (1.3 seconds) if the motor vehicle A runs from the present position (a in FIG. 4) under the present running conditions, and a direction (indicated by c' in FIG. 4) of the running path B at the position (c in FIG. 4, which is a point spaced forward a distance V·Tpre from a location on the running path B which corresponds to the present position of the motor vehicle A) to be reached by the motor vehicle A on the running path B after the predicted time Tpre. Specifically, as shown in FIG. 4, if it is assumed that an angle (between the lines a', c') through which the motor vehicle A is required to turn to change the direction in which the motor vehicle A travels from the present direction to a direction of the running path B at the point c after the predicted time Tpre is set to a target angle θtar, then the predicted angle θpre is calculated as follows:

$$\theta pre=\theta tar-(\gamma \cdot Tpre)$$

where γ represents the present yaw rate of the motor vehicle A which has been read in the step 4, and (γ·Tpre) represents an angle (between the lines a", b' in FIG. 4) through which the direction in which the motor vehicle A travels changes from the present direction in the period of the predicted time Tpre if the motor vehicle A runs at the present yaw rate.

The target angle θtar is determined as follows: The map data of the running path B ahead of the motor vehicle A which have been obtained in the step 7 are converted into data in a coordinate system in which the direction (a' in FIG. 4) in which the motor vehicle A travels at the present position thereof is defined as a y-axis and the transverse direction of the motor vehicle A is defined as an x-axis. Stated otherwise, the map data of the running path B are expressed in the coordinate system of the motor vehicle A. In this coordinate system, a point c which is spaced forward a distance V·Tpre along the running path B from a location on the running path B which corresponds to the present position of the motor vehicle A is determined, and an azimuth of the running path B at the point c with respect to the y-axis (the direction in which the motor vehicle A travels) is determined from the coordinate data of the running path B, thereby determining the target angle θtar.

In this embodiment, the predicted time Tpre has been set to 1.3 seconds based on the experimental data. However, the predicted time Tpre should preferably be set to a suitable value depending on the type, performance, etc. of the motor vehicle A.

According to the second embodiment, the steering control quantity δ is determined using the predicted angle θpre thus determined, according to the equation (2), given below, in the step 11, and the motor vehicle A is steered according to the steering control quantity δ thus determined in the step 12.

$$\delta=P(V, 1/R0)\cdot\epsilon y+P'(V, 1/R0)\cdot\theta+C(V)\cdot\theta pre+a\cdot(1/Rn+1)+b\cdot\gamma \qquad (2)$$

where V represents the present speed of the motor vehicle A, 1/R0 represents the curvature of the running path B at the present position of the motor vehicle A, 1/Rn+1 represents the curvature of the running path B after the predicted time Tpre, and P(V, 1/R0), P'(V, 1/R0) represent functions determined depending on the vehicle speed V and the curvature 1/R0 at the present position, as with the functions P(V, 1/Rn), P'(V, 1/Rn) of the equation (1).

In the equation (2), C(V) represents a function whose value is smaller as the vehicle speed V is higher. For example, the function C(V) is expressed as C(V)=V0/V, where V0 is defined in the same manner as with the equation (1). In the equation (2), "a", "b" represent positive and negative constants, respectively, which are experimentally determined.

The motor vehicle A is steered according to the steering control quantity (steering angle) δ determined by the equation (2) to run smoothly and stably along the running path B in its curved sections as well as straight sections.

The terms P(V, 1/R0)·ey and P'(V, 1/R0)·θ on the right-hand side of the above equation (2) are proportional terms (feedback control terms), respectively, of the displacement ey and the angular error θ, and basically function in the same manner as with the proportional terms of the equation (1) to reduce the displacement ey and the angular error θ. Since the values of the functions P(V, 1/R0), P'(V, 1/R0) become smaller as the vehicle speed V is higher, the lateral stability of the motor vehicle A is increased while the motor vehicle A is running at high speeds. Because the greater the curvature 1/R0 at the present position of the motor vehicle A, the greater the values of the functions P(V, 1/R0), P'(V, 1/R0) become, the ability for the position and the direction of the motor vehicle A to follow the running path B in its curved sections is increased.

The term C(V)·θpre on the right-hand side of the equation (2) is a feedforward control term based on the predicted angle θpre after the predicted time Tpre, i.e., an angular error predicted in the future between the direction in which the motor vehicle A travels and the direction of the running path B. This term C(V)·θpre functions to further increase the ability of the motor vehicle A to follow the running path B in its curved sections, and also to stabilize the behavior of the motor vehicle A. Stated otherwise, the term C(V)·θpre functions to absorb, in advance, angular errors that are predicted in the future.

The term a·(1/Rn+1) on the right-hand side of the equation (2) is a feedforward control term for determining a basic steering angle required for the motor vehicle A to run along a curved section with the curvature 1/Rn+1 ahead of the motor vehicle A.

The term b·γ on the right-hand side of the equation (2) is a feedback control term of the yaw rate γ, and functions to suppress the generation of an excessive yaw rate.

In the steering control process according to the second embodiment, therefore, the steering control quantity δ is determined taking into account not only the present speed V of the motor vehicle A and the displacement ey of the motor vehicle A from the running path B, but also the curvature 1/Rn+1 of the running path B ahead of the motor vehicle A, the angular error θ predicted in the future of the motor vehicle A with respect to the running path B, and the yaw rate γ, and the steering of the motor vehicle A is controlled according to the steering control quantity δ thus determined. Consequently, the motor vehicle A can be steered to run smoothly and stably along the running path B in its curved sections as well as straight sections.

The displacement ey and the angular error θ which are required to determine the steering control quantity δ are determined based on the magnetic detection of the magnetic nails C by the magnetic sensors 1, and the curvature 1/Rn+1 of the running path B ahead of the motor vehicle A and the curvature 1/R0 of the running path B at the present position of the motor vehicle A are obtained from communications with the LCX cable D. Therefore, the data of the displacement ey, the angular error θ, the curvature 1/Rn+1, and the curvature 1/R0 can accurately be attained irrespective of weather conditions, etc. Because the motor vehicle A is steered according to the steering control quantity δ which has been determined using those data, the motor vehicle A can run accurately along the running path B irrespective of weather conditions, etc.

Figure 7:
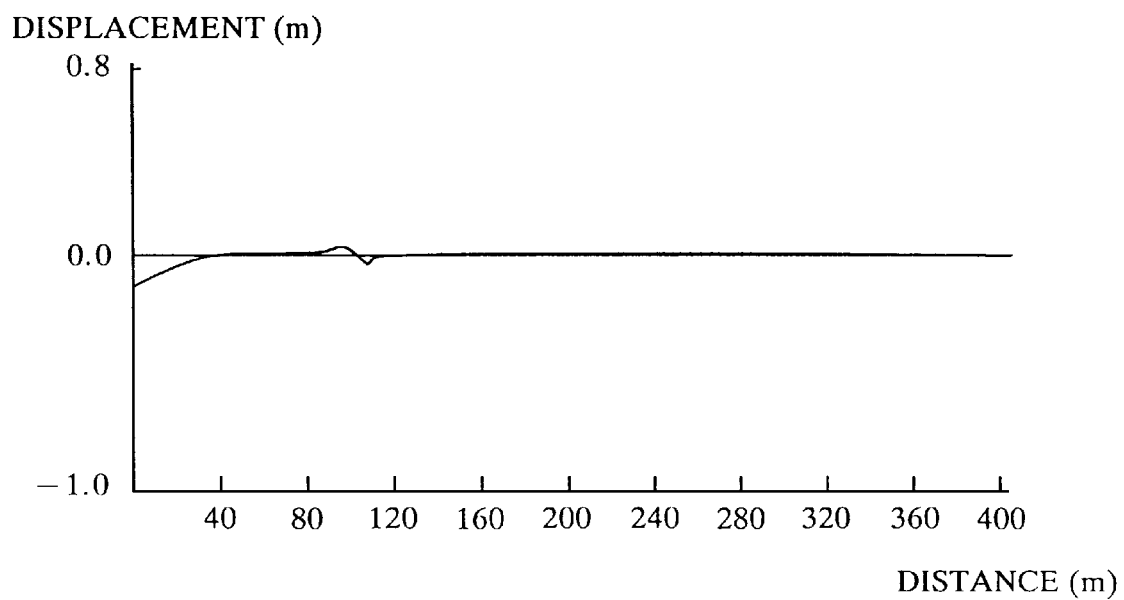
FIG. 7 is a diagram showing the results of an experiment conducted on the automatic steering control apparatus.

FIG. 7 shows measured data of the displacement ey produced between the center of an automatically driven motor vehicle and a given running path when the motor vehicle was actually driven along a curve whose radius of curvature was 140 R at a vehicle speed of 50 km/h under the steering control process according to the present invention. As shown in FIG. 7, any deviation between the running path and the actual route traveled by the motor vehicle was sufficiently small, i.e., was 15 cm at maximum, and its curve was relatively flat. Therefore, it can be understood that a motor vehicle controlled by the steering control process according to the present invention can be steered to follow the running path smoothly and stably even in its curved sections.

In the above steering control process, the curvature of the running path B which is required to determine the steering control quantity δ is determined based on the curvature information obtained through communications with the LCX cable D according to the first embodiment. However, the curvature of the running path B which is required to determine the steering control quantity δ may be determined using the map data (see FIG. 6) stored on the motor vehicle A, rather than the curvature information obtained through communications with the LCX cable D, according to the second embodiment.

Specifically, since the positions of the running path B on the map data are known, the curvatures of the various portions of the running path B can mathematically be calculated using the positional data of the running path B on the map data. For example, if the running path B is expressed by a function Y=F(X), with dY/dX=F' and d²Y/d²X=F'', in the X-Y coordinate system shown in FIG. 6, then the curvature 1/R at each of various portions of the running path B is mathematically determined as follows:

$$1/R = F''/[1+(F')^2]^{3/2}$$

Therefore, the curvature of the running path B which is required to determine the steering control quantity δ may be determined directly from the map data.

For determining steering control quantity δ directly from the map data, in the first and second embodiments, the step 1 in FIG. 3 is dispensed with, and the curvature of the running path B which is required to determine the steering control quantity δ is determined in the step 8 according to the above equation based on the map data which have been extracted in the step 7.

Because the curvature of the running path B which is required to determine the steering control quantity δ can accurately be determined from the map data irrespective of weather conditions, etc., the motor vehicle A can run accurately along the running path B irrespective of weather conditions, etc.

In the above first and second embodiments, the magnetic nails C are used as the path markers. However, the path markers may comprise optical markers such as white lines or the like, and the motor vehicle may have optical sensors, rather than the magnetic sensors, for optically detecting the optical markers.

While the LCX cable D is used as the travel information providing facility along the road in the first and second embodiments, a plurality of communication installations installed at spaced intervals along the road may be employed as the travel information providing facility.

Although certain preferred embodiments of the present invention have been shown and described in detail, it should be understood that various changes and modifications may be made therein without departing from the scope of the appended claims.

What is claimed is:

1. An automatic steering control apparatus for automatically steering a motor vehicle to run along a predetermined running path having path markers, comprising:

first means for holding map data of the running path;

second means for detecting the path markers with a marker sensor on the motor vehicle and successively determining positional relationships between a present position of the motor vehicle and the running path based on a detected output signal from said marker sensor;

third means for successively recognizing positions of the motor vehicle on the map data based on said positional relationships and said map data;

fourth means for attaining curvature information of portions of the running path on the map data through communications with a travel information providing facility disposed outside of the motor vehicle;

fifth means for acquiring curvature information of the running path ahead of the recognized present position of the motor vehicle based on the curvature information attained by said fourth means through communications with the travel information providing facility; and sixth means for determining a steering control quantity for the motor vehicle based on at least the acquired curvature information, a present speed of the motor vehicle, and a present positional relationship between the motor vehicle and the running path.

2. An automatic steering control apparatus according to claim 1, wherein said travel information providing facility comprises a leakage coaxial cable installed on a road along said running path.

3. An automatic steering control apparatus according to claim 1, wherein said path markers comprise magnetic sources arranged at spaced intervals along the running path, said marker sensor comprising a magnetic sensor.

4. An automatic steering control apparatus according to claim 1, wherein each of said positional relationships between the motor vehicle and the running path represents a lateral deviation of a center of the motor vehicle from the running path, and an azimuth deviation of a direction traveled by the motor vehicle from the running path.

5. An automatic steering control apparatus according to claim 1, wherein said third means comprises means for successively determining a route traveled by the motor vehicle based on the speed of the motor vehicle and a yaw rate of the motor vehicle, and means for recognizing the present position of the motor vehicle on the map data from the determined route, the positional relationships between the motor vehicle and the running path, and the map data of the running path.

6. An automatic steering control apparatus according to claim 1, further comprising:

means for determining a deviational angle, as a predicted angle, between a direction to be traveled by the motor vehicle after a predetermined time if the motor vehicle runs under present running conditions from the present position of the motor vehicle, and a direction of the motor vehicle at a location of the running path which corresponds to a position to be reached by the motor vehicle after the predetermined time;

said sixth means comprising means for determining said steering control quantity based on said predicted angle, the curvature information of the running path ahead of the motor vehicle, the present speed of the motor vehicle, and the present positional relationship between the motor vehicle and the running path.

7. An automatic steering control apparatus for automatically steering a motor vehicle to run along a predetermined running path having path markers, comprising:

first means for holding map data of the running path;

second means for detecting the path markers with a marker sensor on the motor vehicle and successively determining positional relationships between a present position of the motor vehicle and the running path based on a detected output signal from said marker sensor;

third means for successively recognizing positions of the motor vehicle on the map data based on said positional relationships and said map data;

fourth means for acquiring curvature information of the running path ahead of the recognized present position of the motor vehicle from said map data; and fifth means for determining a steering control quantity for the motor vehicle based on at least the acquired curvature information, a present speed of the motor vehicle, and a present positional relationship between the motor vehicle and the running path.

8. An automatic steering control apparatus according to claim 7, wherein said path markers comprise magnetic sources arranged at spaced intervals along the running path, said marker sensor comprising a magnetic sensor.

9. An automatic steering control apparatus according to claim 7, wherein each of said positional relationships between the motor vehicle and the running path represents a lateral deviation of a center of the motor vehicle from the running path, and an azimuth deviation of a direction traveled by the motor vehicle from the running path.

10. An automatic steering control apparatus according to claim 7, wherein said third means comprises means for successively determining a route traveled by the motor vehicle based on the speed of the motor vehicle and a yaw rate of the motor vehicle, and means for recognizing the present position of the motor vehicle on the map data from the determined route, the positional relationships between the motor vehicle and the running path, and the map data of the running path.

11. An automatic steering control apparatus according to claim 7, further comprising:

means for determining a deviational angle, as a predicted angle, between a direction to be traveled by the motor vehicle after a predetermined time if the motor vehicle runs under present running conditions from the present position of the motor vehicle, and a direction of the motor vehicle at a location of the running path which corresponds to a position to be reached by the motor vehicle after the predetermined time;

said fifth means comprising means for determining said steering control quantity based on said predicted angle, the curvature information of the running path ahead of the motor vehicle, the present speed of the motor vehicle, and the present positional relationship between the motor vehicle and the running path.

12. An automatic steering control apparatus for automatically steering a motor vehicle to run along a predetermined running path having path markers, comprising:

a first marker sensor adapted to detect the path markers;

a leakage coaxial cable information transmitter and receiver that receives travel information from a leakage coaxial cable outside of the motor vehicle;

a navigation device that determines a route traveled by the motor vehicle and a positional relationship of the motor vehicle with respect to the running path to determine a position of the motor vehicle on map data, said map data being stored on the motor vehicle; and a lateral control device that calculates a steering control quantity based on at least information received from the navigation device and a present speed of the motor vehicle.

13. An automatic steering control apparatus according to claim 12, further comprising a yaw rate sensor that detects a yaw rate of the motor vehicle, said yaw rate being considered by the navigation device in determining the route traveled.

14. An automatic steering control apparatus according to claim 12, wherein the travel information received from the leakage coaxial cable comprises curvature information of portions of the running path on the map data.

15. An automatic steering control apparatus according to claim 14, wherein the navigation device further determines curvature information of the running path ahead of a recognized position of the motor vehicle based on the curvature information received from the leakage coaxial cable by the leakage coaxial cable information transmitter and receiver.

16. An automatic steering control apparatus according to claim 15, wherein the positional relationship of the motor vehicle with respect to the running path represents a lateral deviation of a center of the motor vehicle from the running path, and an azimuth deviation of a direction traveled by the motor vehicle from the running path.

17. An automatic steering control apparatus according to claim 16, wherein the navigational device further determines a deviational angle between a direction to be traveled by the motor vehicle after a predetermined time if the motor vehicle runs under present running conditions from its present position, and a direction of the motor vehicle at a location of the running path corresponding to a position to be reached by the motor vehicle after the predetermined time.

18. An automatic steering control apparatus according to claim 15, wherein the navigational device further determines a deviational angle between a direction to be traveled by the motor vehicle after a predetermined time if the motor vehicle runs under present running conditions from its present position, and a direction of the motor vehicle at a location of the running path corresponding to a position to be reached by the motor vehicle after the predetermined time.

19. An automatic steering control apparatus according to claim 15, further comprising a second marker sensor, and wherein the first marker sensor is disposed beneath the front end of the motor vehicle and the second marker sensor is disposed beneath the rear end of the motor vehicle.

20. An automatic steering control apparatus according to claim 19, wherein the path markers are magnetic sources and the marker sensors are magnetic sensors.

* * * * *